(12) United States Patent
Savenkova et al.

(10) Patent No.: US 12,404,965 B2
(45) Date of Patent: Sep. 2, 2025

(54) NON-INTRUSIVE TRACKING OF OBJECTS AND FLUIDS IN WELLBORES

(71) Applicant: Halliburton Energy Services, Inc., Houston, TX (US)

(72) Inventors: Anna Savenkova, Aberdeen (GB); Graham Peter Jack, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 35 days.

(21) Appl. No.: 18/016,410

(22) PCT Filed: Dec. 18, 2020

(86) PCT No.: PCT/US2020/065909
§ 371 (c)(1),
(2) Date: Jan. 16, 2023

(87) PCT Pub. No.: WO2022/060392
PCT Pub. Date: Mar. 24, 2022

(65) Prior Publication Data
US 2023/0287782 A1 Sep. 14, 2023

Related U.S. Application Data

(60) Provisional application No. 63/080,431, filed on Sep. 18, 2020.

(51) Int. Cl.
*F16L 55/48* (2006.01)
*E21B 43/12* (2006.01)
(Continued)

(52) U.S. Cl.
CPC ............ *F16L 55/48* (2013.01); *E21B 47/047* (2020.05); *E21B 47/095* (2020.05); *F16L 55/38* (2013.01);
(Continued)

(58) Field of Classification Search
CPC ....... E21B 47/047; E21B 47/095; E21B 47/09
See application file for complete search history.

(56) References Cited

U.S. PATENT DOCUMENTS

| 4,590,799 A | 5/1986 | Brown et al. |
| 5,417,112 A | 5/1995 | Rosenberg |

(Continued)

FOREIGN PATENT DOCUMENTS

| CN | 1062946 | 3/2001 |
| CN | 108374654 | 8/2018 |

(Continued)

OTHER PUBLICATIONS

Technical Research Centre of Finland, Timo Siikonen, Computer Program TMOC for Calculating of Pressure Transients in Fluid Filled Piping Networks.
(Continued)

*Primary Examiner* — Kristyn A Hall
(74) *Attorney, Agent, or Firm* — Thomas Rooney; C. Tumey Law Group PLLC (57) ABSTRACT

Systems and methods of the present disclosure relate to non-intrusively monitoring a fluid level or an object in a conduit. A system comprises a component positioned to control flow into or out of the conduit to induce pressure waves in the conduit; a pressure transducer in fluid communication with the conduit, the pressure transducer positioned to measure pressure responses in the conduit due to contact of the pressure waves with the fluid level or the object; and a system controller operable to: receive pressure data from the pressure transducer, the pressure data comprising the pressure responses; and determine a distance of the fluid level or the object in the conduit, relative to the component or the pressure transducer, based on the pressure responses.

20 Claims, 5 Drawing Sheets

(51) Int. Cl.

| | | |
|---|---|---|
| *E21B 47/047* | (2012.01) | |
| *E21B 47/095* | (2012.01) | |
| *F16L 55/38* | (2006.01) | |
| *F16L 101/12* | (2006.01) | |
| *F16L 101/30* | (2006.01) | |
| *G01F 23/2962* | (2022.01) | |
| *G01S 15/08* | (2006.01) | |
| *G01V 1/46* | (2006.01) | |

(52) U.S. Cl.
CPC .......... *G01F 23/2962* (2013.01); *G01S 15/08* (2013.01); *G01V 1/46* (2013.01); *E21B 43/126* (2013.01); *F16L 2101/12* (2013.01); *F16L 2101/30* (2013.01)

(56) References Cited

U.S. PATENT DOCUMENTS

| | | | |
|---|---|---|---|
| 5,549,000 | A | 8/1996 | Brown et al. |
| 6,401,814 | B1 | 6/2002 | Owens et al. |
| 6,710,720 | B2 | 3/2004 | Carstensen et al. |
| 6,993,963 | B1 * | 2/2006 | Gudmundsson ........ E21B 47/06 73/152.52 |
| 7,222,549 | B2 | 5/2007 | Abney |
| 8,973,444 | B2 | 3/2015 | Hill et al. |
| 9,535,039 | B2 | 1/2017 | Farquée et al. |
| 9,599,272 | B2 | 3/2017 | Hartog et al. |
| 9,828,847 | B2 | 11/2017 | Vavik |
| 11,131,158 | B1 * | 9/2021 | Shariff .................. E21B 17/003 |
| 2014/0262245 | A1 * | 9/2014 | Hill ....................... E21B 47/047 166/250.03 |
| 2015/0323119 | A1 | 11/2015 | Gunta et al. |
| 2015/0331007 | A1 | 11/2015 | Gunta et al. |
| 2017/0234713 | A1 | 8/2017 | McCoy |
| 2017/0268714 | A1 | 9/2017 | Giron et al. |
| 2019/0129047 | A1 * | 5/2019 | Clark .................... E21B 47/095 |

FOREIGN PATENT DOCUMENTS

| | | | |
|---|---|---|---|
| GB | 2506838 | 7/2017 | |
| JP | 05-086792 | 4/1993 | |
| JP | 106129942 | 5/1994 | |
| KR | 20170038574 | 4/2017 | |
| KR | 20170050045 | 5/2017 | |
| WO | 2006054054 | 5/2006 | |
| WO | 2011070343 | 6/2011 | |
| WO | 2014107370 | 7/2014 | |
| WO | WO-2018132103 A1 * | 7/2018 | ........... E21B 43/162 |

OTHER PUBLICATIONS

Durali, Mohammad; Fazeli, Amir; Nabi, Ali (2007). [ASME ASME 2007 International Mechanical Engineering Congress and Exposition—Seattle, Washington, USA (Nov. 11-15, 2007)] vol. 9: Mechanical Systems and Control, Parts A, B, and C—Investigation of Dynamics and Vibration of PIG in Oil and Gas Pipelines. , ( ), 2015-2024.

Sensors, Renan Pires de Araujo, et al., Pipeline Inspection Gauge's Velocity Simulation Based on Pressure Differential Using Artificial Neural Networks, 2018.

Downhole Diagnostic, Acoustic Fluid Level Surveys. Available at https://www.downholediagnostic.com/fluid-level. Accessed Dec. 14, 2020.

Circor, Pipeline Blockage Detection—ACOUSTEK®. Available at https://www.circor.com/services/pipeline-blockage-detection-acoustek. Accessed Dec. 14, 2020.

Paradigm Flow Services, Locate Blockages of Was, Asphaltene, Sand, Scale, Hydrates and Stuck Pigs. Available at https://www.paradigm.eu/flow/technology/find-block. Accessed Dec. 14, 2020.

PPS—InnerVue, Available at https://www.ppsa-online.com/directory-of-members?company_id=191. Accessed Dec. 14, 2020.

International Search Report and Written Opinion for PCT/US2020/065909 dated Jun. 10, 2021.

Saudi Arabian Office Action for SA Patent Application No. 523442571 dated Mar. 28, 2024. English Machine Translation with Original Untranslated Version, PDF file. 16 pages.

* cited by examiner

NON-INTRUSIVE TRACKING OF OBJECTS AND FLUIDS IN WELLBORES

CROSS REFERENCE TO RELATED APPLICATIONS

This application is a national stage application, filed under 35 U.S.C. 371, of international patent application no. PCT/US2020/065909, filed Dec. 18, 2020, which claims the priority of U.S. Provisional Patent Application No. 63/080,431, filed Sep. 18, 2020, which is incorporated by reference in its entirety.

BACKGROUND

In the oilfield, knowledge of a well condition such as a fluid level, for example, may facilitate optimal production operations. Existing technologies may employ various sensors such as pressure gauges or density gauges for determining the fluid level. However, implementation of these gauges may be limited by distance. Therefore, these gauges may only be installed at particular depths in a well. Additionally, older wells may not include these gauges which may limit techniques to determine the fluid level therein.

Although well intervention may be another option to determine the fluid level in the well, this type of operation may not allow for a continuous monitoring of the fluid level throughout a life cycle of the well. Further, the well intervention may involve a substantial amount of time, resources, or risk. For example, servicing an offshore installation such as a normally unmanned installation (NUI), may require a mobilization of a drilling rig.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to real-time non-intrusive techniques for monitoring targets such as fluid levels or objects within conduits such as a wellbore or an underground storage facility. The targets to be tracked may include various objects or fluids such as hydrates, media or phase change of fluid(s), fluid influxes into a wellbore, and/or fluid levels in gas storage wells or cavern storage facilities that may store various fluids such as hydrogen. In some examples, the hydrates may be tracked during hydrate remediation operations. The targets may also include downhole plugs, tools, or debris disposed in the wellbore or an annulus thereof.

In particular examples, a system controller and a pressure measurement device may be implemented into existing infrastructure that may include components such as, for example, a wellhead, piping, a valve, a pump, or a vessel. The existing infrastructure may be utilized to control a flow of a fluid to induce positive and/or negative pressure waves within the conduit. Each of the components may be positioned to control a flow of fluid within a conduit to induce pressure waves.

Tracking of a target may occur in real-time via an analysis of induced pressure waves and their corresponding responses that travels along the conduit back to the origin or source of the pressure wave inducement. The tracking may be performed by inducing pressure waves in the conduit, and analyzing pressure responses to determine real-time locations, such as a depth or a distance of the target within the wellbore, relative to a position of the source of the pressure wave inducement. Location updates or location information such as fluid levels or object position may be transmitted to a web portal/or remote hardware to provide live tracking.

In some examples, at least two pressure waves may be induced within a wellbore to elicit or cause at least two corresponding pressure responses that may reflect off of the desired target that is disposed within the wellbore, and travel as a pressure response back along the wellbore to the source of the pressure wave inducement for analysis by a system controller. An interaction due to contact between the induced pressure waves and the desired target may result in the pressure responses. The system controller may determine a location of the target based on the pressure wave responses.

An automated system, without human involvement, may adjust a production parameter such as a flow rate into or out from the wellbore; reduce a water load in the wellbore (e.g., add a foaming agent into the wellbore); or adjust a valve such as a choke, all of which may be based on the pressure responses. In some examples, the real time tracking of fluid levels in a production well may provide insight for reservoir analysis.

In certain examples, the real-time tracking may allow for an accurate assessment of time duration for cementing operations (e.g., tracking positions of plugs) and fishing operations for downhole tools that may be stuck in the wellbore. Additionally, the real-time tracking may allow for locating of objects or fluids in an annulus that may include an open-hole portion.

The techniques described herein may provide for increased accuracy and distance capability over other methods such as acoustic diagnostics, fiber optic downhole gauging or fiber optic cables. For example, numerous sensors positioned along a conduit, are not required; rather, flow rates and pressures in the conduit may be measured at or near the wellhead, using one or more pressure waves. Additionally, locations may be overlaid upon wellbore completion diagrams.

Figure 1A:
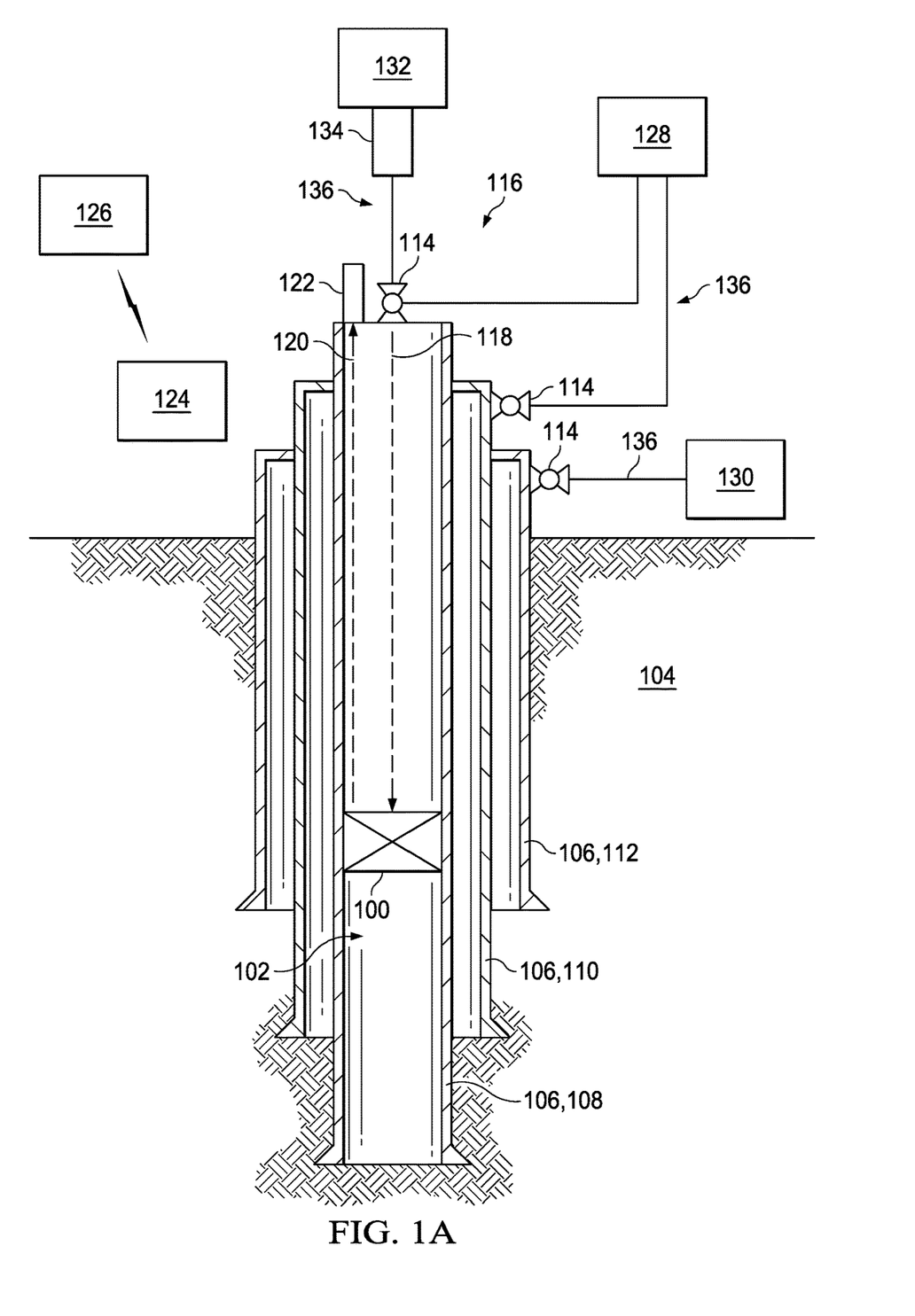
FIG. 1A illustrates a wellbore including a target to be located, in accordance with examples of the present disclosure.

FIG. 1A illustrates a target 100 disposed in a conduit such as a wellbore 102 that extends into a subterranean formation 104, in accordance with examples of the present disclosure. In some examples, the target 100 may include various objects and/or fluids. For example, the target 100 may include debris, a top of a cement column, plugs, downhole tools (e.g., bottom hole assembly including measurement modules), completion collapse, various fluids, and/or fluid changes (e.g., based on density or viscosity) in the wellbore 102. In some examples, the techniques as described herein, may non-intrusively provide a depth of a top of downhole tool, such as a stuck tool, allowing for an effective fishing operation.

The wellbore 102 may include conduits 106 such as casing which may include a first section 108, a second section 110, and a third section 112 concentrically disposed within the wellbore 102. Each section 108, 110, and 112 of the casing may include a corresponding valve 114 located at a wellhead 116 (or adjacent pipes in fluid communication with the wellhead 116). The valves 114 may allow for an ingress or egress of fluid into or out of the wellbore 102 to induce a pressure wave 118.

Manipulation such as rapid opening and closing of a valve 114 may induce pressure waves within the wellbore 102. The valve 114 may open and close within seconds. In some examples, 5 seconds may be the maximum open time. In other examples, the valve 114 may remain open for 1 second or less before it is closed. Longer durations may work as well (subject to the system parameters and depth of the object/fluid position).

Upon manipulation of a valve 114, the pressure wave 118 may travel inside and along the corresponding conduit 106 (e.g., at the speed of sound) and may reflect off the target 100 as a reflected pressure wave 120 to travel back to the valve 114. The reflected pressure wave 120 may correspond to features detected in the wellbore 102, such as the target 100, for example. The reflected pressure wave may be considered a pressure response in some examples.

The pressure wave 118 may include a positive and/or a negative pressure wave that may be induced within the wellbore 102. A number of suitable techniques, in addition to the valve 114, may be used for inducing pressure waves. For example, a reciprocating pump 128 may remove fluid from the wellbore 102 to induce negative pressure waves. The pumping may occur in intervals. In additional examples, existing pressure waves in the system may be used as a source for the pressure recording and data collection. In particular examples, the valve 114 may be a hydrodynamic valve that may be operated manually. In other examples, the valve 114 may be automated and/or controlled remotely. By way of further examples, fluid may be released from the wellbore 102 into an expansion vessel 130, or the valve 114 may be used to bleed fluid from the wellbore 102.

In addition to or in combination with the negative pressure, a positive pressure wave may also be induced in the wellbore 102. In particular examples, a supply tank or a supply vessel 132 may supply fluid into the wellbore 102 to induce a positive pressure wave in the wellbore 102. In some examples, the supply vessel 132 may utilize a pump 134 to move fluid into the wellbore 102. The supply vessel 132 may provide any suitable fluids into the wellbore 102. Additionally, the pump 128 may pump fluid into the wellbore 102. Non-limiting examples of fluids passed into the wellbore 102 may include gas such as nitrogen, carbon dioxide, and/or natural gas, into a gas system, or water (or other suitable liquid) into a liquid system. In some examples, hydrodynamic waves may be induced by an injection of the gas into the wellbore 102.

The reciprocating pump 128 and the vessels 130 and 132 may be in fluid communication with the wellbore 102 via valves 114 and/or conduits 136. It should be noted that in some examples, the mechanisms to induce pressure waves such as those described herein, may be disposed at an above-ground location such as at a surface of the wellbore 102. The pressure waves may be induced at regular intervals, or the intervals may be variable. In particular examples, sonic waves may be induced at regular or variable intervals and may be utilized in accordance with examples of the present disclosure.

The pressure transducer 122 may be in fluid communication with the wellbore 102 to measure pressure variations at a high or ultra-high sampling rate (e.g., 1 kilohertz (kHz), 1-4 kHz, or greater than 4 kHz). In certain examples, the sampling rate me be less than 1 kHz or greater than 4 kHz. In some examples, the pressure transducer 122 may measure pressures up to (but not limited to) about 22,500 pounds per square inch (psi) or about 1550 bar. Signals from the pressure transducer 122 may be recorded with a system controller 124.

Once the data is collected, analyzed, and/or extrapolated into profiles, for example, via the system controller 124, a diagnostic of the well condition may be provided. In some examples, this may include reporting to facilitate decision-making and remediation plans without sacrificing production uptime or throughput. In some examples, the system controller 124 may be operated remotely (e.g., wirelessly or connected by a cable) via a device 126 which may include a personal computer, tablet, smartphone, or other digital device.

In some examples, pressure wave inducement in the wellbore 102 may occur manually or may be automated via the system controller 124. The system controller 124 may control fluid flow into and out of the wellbore 102 based on the pressure responses or the fluid levels in the wellbore 102. For example, the system controller 124 may be operable to control various components such as the valves 114 and/or the pumps 128 and 134, to induce the pressure waves that may travel through the wellbore 102 eliciting a pressure response. The pressure response includes a reflected pressure wave that has been reflected off the target 100 back to the source of the pressure wave inducement. The reflected pressure response may be measured by the pressure transducer 122 and recorded at a high or ultra-high rate (e.g., at least 1 kHz) by the system controller 124 for analysis, such as determining fluid levels within the wellbore 102, pressure profiles of single phase and multi-phase fluids in the wellbore 102, and/or determining a location of an object in the wellbore 102.

Upon manipulating a component (e.g., a valve, pump, and/or vessel) of a hydraulic system, a fluid flow may temporarily be stopped or restricted to induce a pressure wave in the wellbore 102, and a pressure in the wellbore 102 may be continuously recorded at a point upstream to the component, using the Joukowsky equation, for example:

$$\Delta p_a = \rho u a \quad (1)$$

where $\Delta p_a$ represents a surge pressure; $\rho$ represents a fluid density, u represents a fluid flowing velocity and a represents the speed of sound in the fluid, to estimate the magnitude of the water hammer and using the Darcy-Weisbach equation:

$$\Delta p_f = \left(\frac{f}{2}\right)\left(\frac{\Delta L}{d}\right)\rho u^2 \quad (2)$$

where f is the friction factor, L is a pipe length, d is a pipe diameter, $\rho$ is fluid density and u is fluid velocity, to determine the frictional pressure drop, thereby obtaining a time-log of the pressure change in the conduit. A distance-log of pressure change may be obtained from the time-log and an estimate of the speed of sound in the actual multiphase flow media, using the formula:

$$\Delta L = 0.5 a \Delta t \quad (3)$$

to obtain the relation between time (Δt) and distance (ΔL). This technique may allow for monitoring of fluids or objects within a conduit, for example. In some examples, a system controller may determine the location of a target in a wellbore relative to a location of a measured pressure response or a location of the pressure wave inducement via Equations 1 to 3. For example, the system controller may calculate a distance from a pressure transducer to the target as half the distance a pressure wave travels from the time of the pressure wave inducement to the time the pressure response is measured or received by the pressure transducer. The distance between the pressure transducer and the target may be utilized to calculate a distance to the target relative to a pressure inducement location such as a valve or pump, for example.

The system controller 124 may include a display, a storage unit, and/or any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the system controller 124 may be a computer, a network storage device, or any other suitable device and may vary in size, shape, performance, functionality, and price. The system controller 124 may include a processing unit (e.g., microprocessor, central processing unit, programmable logic controller (PLC), etc.) that may process data by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. The non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. The system controller 124 may also include input device(s) (e.g., keyboard, mouse, touchpad, etc.) and output device(s) (e.g., monitor, printer, etc.). The input device(s) and output device(s) provide a user interface. For example, the system controller 124 may enable an operator to select and perform analysis, view collected data, view analysis results, and/or perform other tasks.

The system controller 124 may be in communication (e.g., wire or wireless) with various components via various communication paths and may be operable to control the components. In some examples, the system controller 124 may be operated remotely (e.g., wirelessly) via a device 126 which may include a personal computer, tablet, smartphone, or other digital device. In some examples, the system controller 124 may be battery-powered (e.g., rechargeable lithium-ion battery or other type of batteries) with up to 15 hours (or more) of operation time and may include piezoelectric switches. In other examples, the system controller 124 may be powered by an electric grid and/or a portable generator.

Figure 1B:
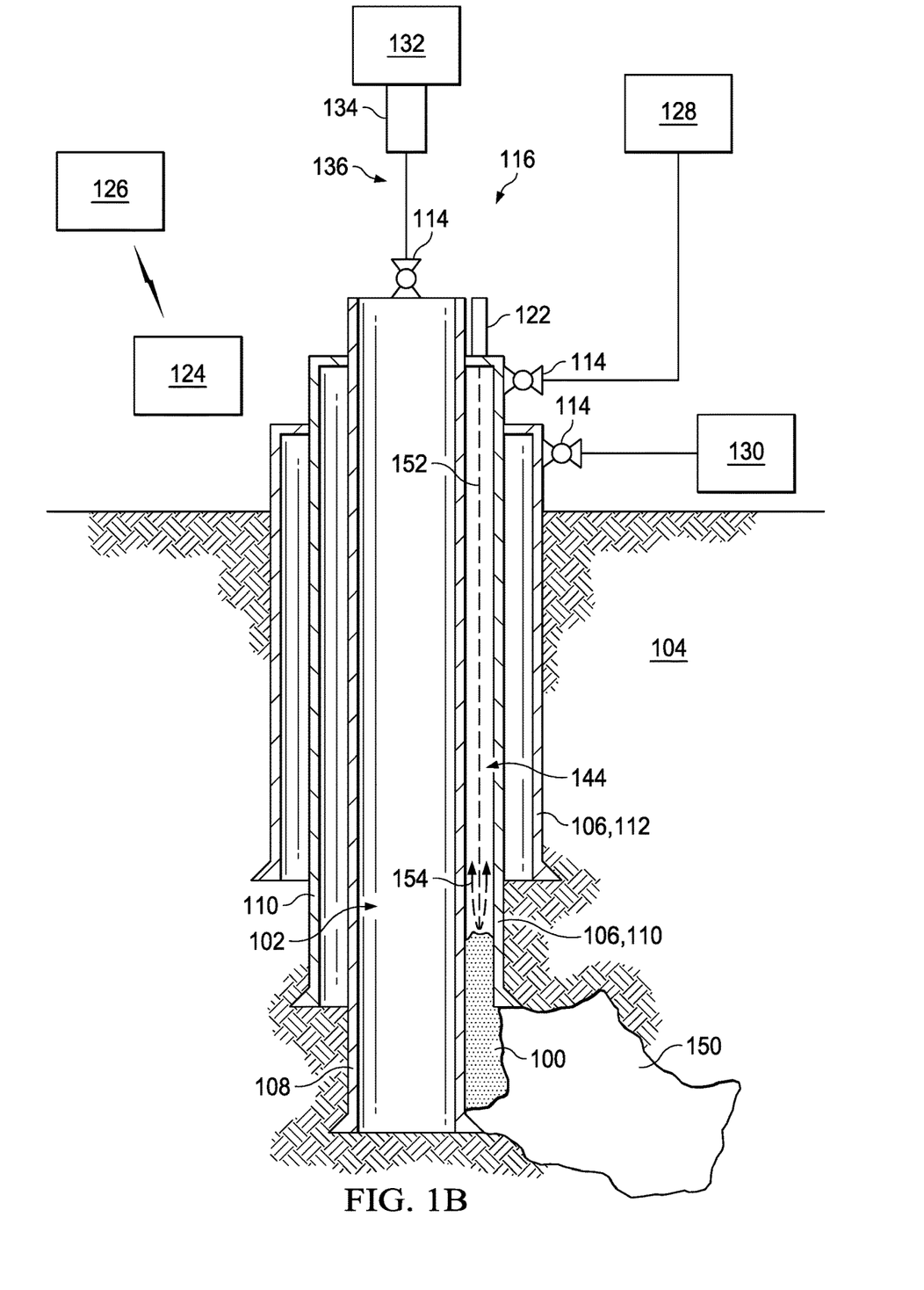
FIG. 1B illustrates an annulus of a wellbore including a target to be located, in accordance with examples of the present disclosure.

FIG. 1B illustrates the target 100 disposed within an annulus 144 that extends into the subterranean formation 104, in accordance with examples of the present disclosure. The target 100 may be disposed in the annulus 144 between the first section 108 and the second section 110 of casing, in some examples. In some examples, the target 100 may include debris from an un-cased section or an open-hole interval 150 that may be in fluid communication with the annulus 148.

Upon manipulation of a valve 114, a pressure wave 152 or wave may travel inside and along the sections 108 and 110 in the annulus 144 (e.g., at the speed of sound) and may reflect off the target 100 as a reflected pressure wave 154. The reflected pressure wave 154 may correspond to features or fluids detected in the annulus 148, such as the target 100. In certain examples, the system controller 124 may manipulate the valves 114 based on fluid levels within the annulus 144.

The pressure transducer 122 may be in fluid communication with the annulus 144 to measure the pressure variations therein. Signals from the pressure transducer 122 may be recorded with the system controller 124. As previously noted, the system controller 124 may be operable to control the valves 114, the pump 128, the pump 134 that is fluidly coupled to the supply vessel 132, and/or the valves 114 to induce the pressure waves that may travel through the wellbore 102 eliciting a pressure response. This data may be collected, analyzed, and/or extrapolated into profiles via the system controller 124 to provide a diagnostic of the well condition.

In some examples, the system controller 124 may be operated remotely (e.g., wirelessly) via a device 126 which may include a personal computer, tablet, smartphone, or other digital device suitable for surface and underwater. It should be noted that the configurations as shown on FIGS. 1A and 1B may be utilized onshore or offshore and may also be applicable to underground caverns or storage facilities.

Figure 1C:
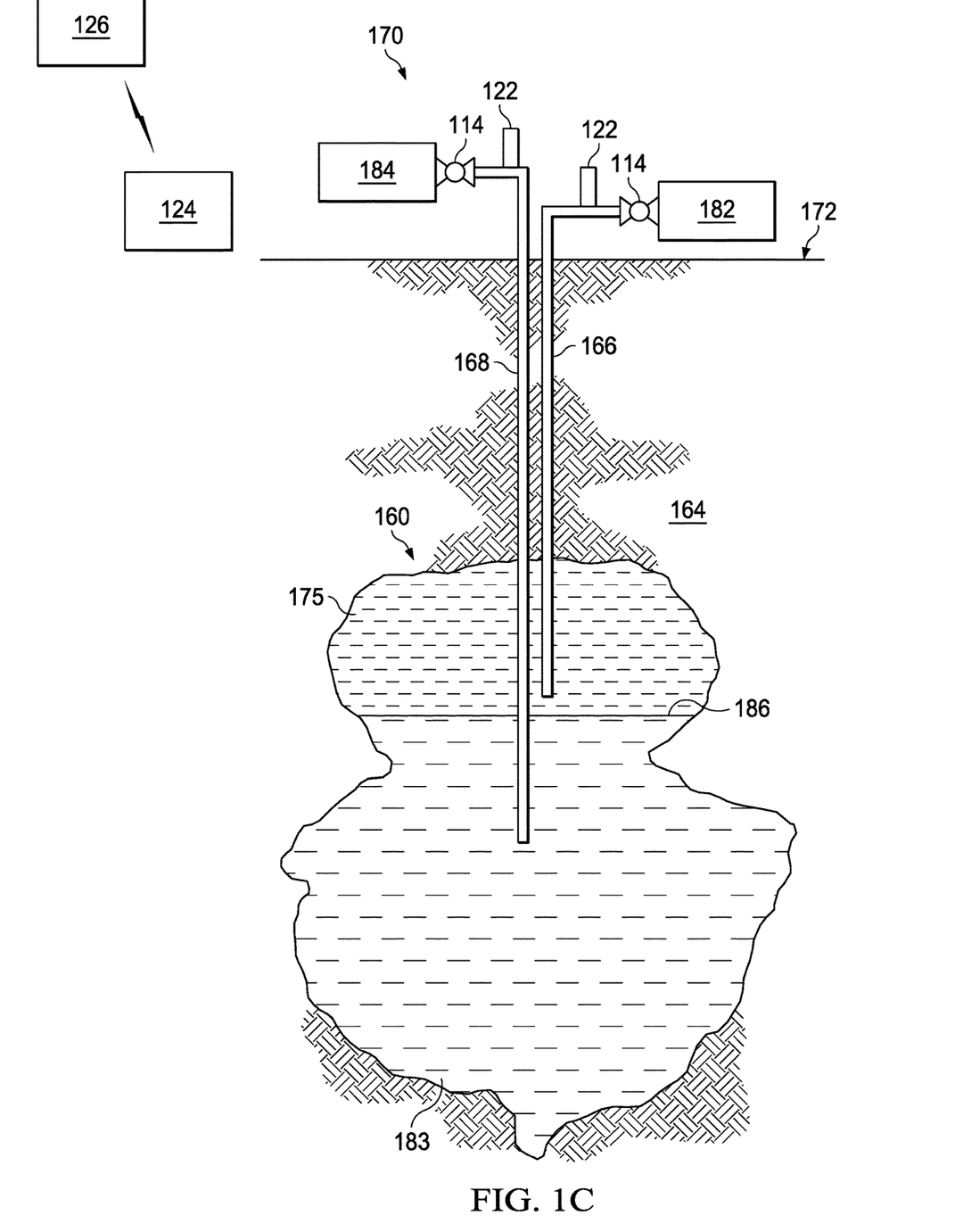
FIG. 1C illustrates an underground fluid storage facility, in accordance with examples of the present disclosure.

FIG. 1C illustrates an underground storage facility 160, in accordance with examples of the present disclosure. The underground storage facility 160 (e.g., a salt cavern) may be disposed in a subterranean formation 164. Various types of fluids may be stored within the underground storage facility 160. Non-limiting examples of the fluids may include a liquid and/or a gas such as brine, natural gas, and or hydrogen.

A first conduit 166 and a second conduit 168 may extend into the cavern 162 from a location 170 that may be above the ground 172 (e.g., a surface location). The conduits 166 and 168 may pass liquids or gas into or out from the underground storage facility 160.

For example, a gas 175 may flow into the underground storage facility 160 via the first conduit 166. A valve 114 may be operable to control the flow of the gas 175 into the underground storage facility 160. The gas 175 may flow into the underground storage facility 160 from a fluid source 182 such as a pipeline or a vessel. In some examples, a liquid 183 may flow via a second valve 114 from the underground storage facility 160 into a structure 184 such as a pipeline or a vessel.

As previously noted, manipulation such as the rapid opening and closing of a valve 114 may induce pressure waves within the underground storage facility 160. The valve 114 may open and close within seconds. In some examples, 5 seconds may be the maximum open time. In other examples, the valve 114 may remain open for 1 second or less before it is closed. In other examples, longer durations may work as well (subject to the system parameters and depth of the object/fluid position).

Upon manipulation of the valves 114, pressure waves (e.g., a negative pressure or a positive pressure) may travel inside and along the conduits 166 and 168 through the gas 175, the liquid 183, or a gas-liquid interface 186. The pressure waves may reflect off of the various fluids or interfaces within the underground storage facility 160 and may correspond to fluid levels therein. The reflected pressure waves may be received by the pressure transducers 122 and analyzed by the system controller 124 and/or the device 126, as noted previously.

The system controller 124 may be in communication and/or operable to operate various components such as the valves 114, the pressure transducers 122, the fluid source 182, and/or the structure 184 via wired and/or wireless communication paths. In certain examples, the system controller 124 may operate the components based on the fluid levels within the underground storage facility 160.

Figure 2:
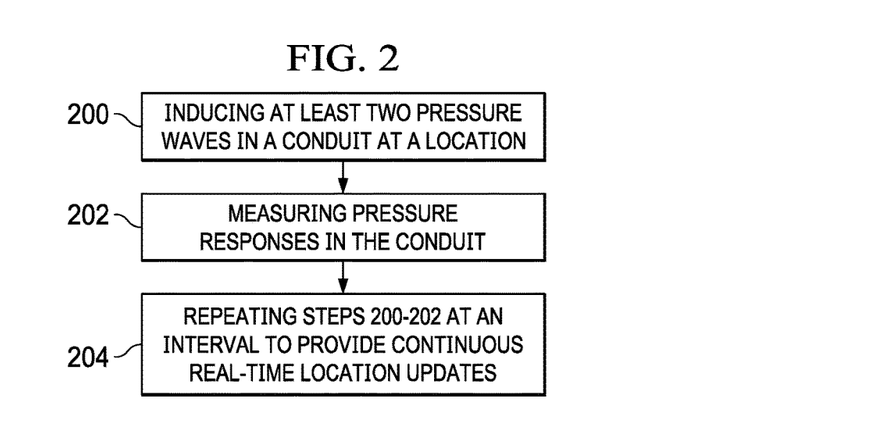
FIG. 2 illustrates a flow chart for locating and tracking of targets such as moving or stationary objects and/or fluids within conduits, in accordance with examples of the present disclosure.

FIG. 2 illustrates a flow chart for locating and tracking of moving or stationary targets within wellbores, in accordance with examples of the present disclosure. At step 200, at least two pressure waves may be induced within a conduit (e.g., the wellbore 102 shown on FIGS. 1A and 1B; or the underground storage facility 160 shown on FIG. 1C). As previously described, the pressure waves may be induced within the conduit by controlling flow into or out of the conduit. The pressure waves may have similar or different properties such as frequencies and/or amplitudes, in some examples. The pressure waves may travel along a bore of the conduit to the target 100 (e.g., shown on FIGS. 1A and 1B) and reflect back to an end of the wellbore 102 where the wave was induced or the source of the pressure wave inducement. The reflected pressure waves may be considered pressure responses in some examples.

At step 202, the pressure responses may be measured by a pressure transducer (e.g., the pressure transducer 122 shown on FIGS. 1A-1C) at an ultra-high sampling rate and recorded by a high frequency data recorder (e.g., the system controller 124 shown on FIGS. 1A and 1B). In some examples, the pressure waves may be induced before either pressure response is measured. In other examples, a first response may be measured before a second response is measured. The pressure responses may be analyzed on site or transmitted offsite to determine a distance of the target 100 relative to the wave inducement location.

At step 204, the preceding steps may be repeated at an interval to provide continuous real-time location updates using Equations 1-3, for example. A current location may be compared to a previous location to determine movement of the target 100. An automated warning system (e.g., the system controller 124 shown on FIGS. 1A-1C) may send a message (e.g., text, email) to a user when a fluid level fails to satisfy a threshold or is deemed to be too high or too low.

In some examples, the interval may be variable or set. A time period for each interval may include any interval longer than the time required for a wave to travel the entire length of the wellbore and return to the data recorder (e.g., the pressure transducer 122). This may be calculated on a case-by-case basis and kept as short as possible. Location updates or location information such as fluid levels may be transmitted to a web portal to provide live tracking.

Figure 3:
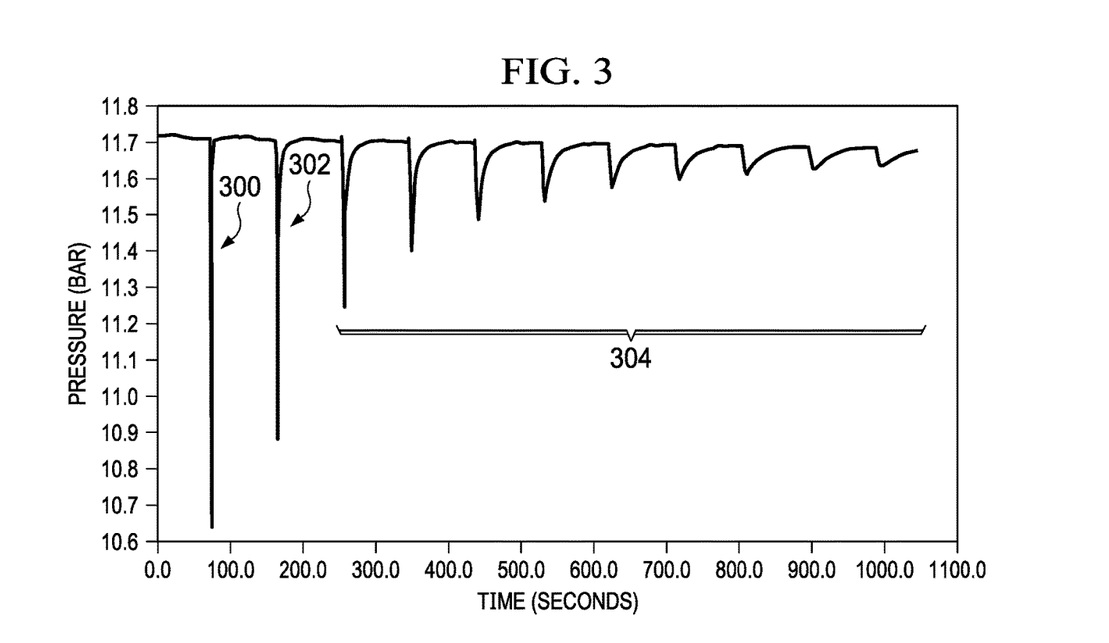
FIG. 3 illustrates a pressure response during a tracking of targets disposed in a conduit, in accordance with examples of the present disclosure.
Figure 4:
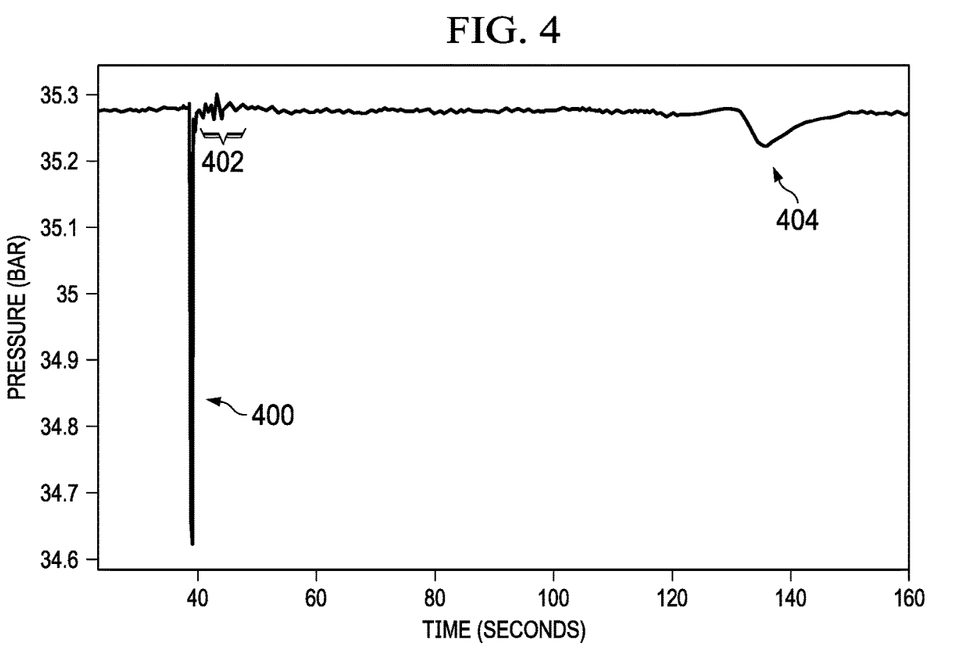
FIG. 4 illustrates a measured pressure response with noise, in accordance with examples of the present disclosure.

FIGS. 3 and 4 illustrate pressure responses during tracking of a target, in accordance with examples of the present disclosure. As shown on FIG. 3, a pressure wave 300 may be induced to contact the target and elicit a pressure response 302 (e.g., a reflection of the pressure wave 300) and corresponding residual data 304 such as residual pressure waves, for example. The residual data 304 may not be relied upon to track the target. As previously noted, the speed of sound in the fluid and the time from the pressure wave inducement to the first pressure response (e.g., the pressure response 302) may be calculated. Also, a distance from a pressure transducer to the location of the target in the conduit may be calculated via Equations 1 to 3. For example, the distance to the target from the pressure transducer, may be determined as half the distance the pressure wave 300 travels from the time of the pressure wave inducement to the time the pressure response 302 is measured or received by a pressure transducer. The distance between the pressure transducer and the target may be utilized to calculate a distance to the target relative to a pressure inducement location such as a valve or pump, for example. In some examples, as illustrated on FIG. 4, measured pressures may include an induced wave 400, noise 402, and a pressure response 404.

In certain examples, systems and methods of the present disclosure may be applicable to either a temporary installation or a permanent installation. For the permanent installation, the system or method may be triggered by an operator manually initiating the techniques described herein with a button or software interface, for example.

Accordingly, the systems and methods of the present disclosure may allow for a determination of a fluid level or a location of an object in a conduit such as a wellbore or an underground storage facility. The systems and methods may include any of the various features disclosed herein, including one or more of the following statements.

Statement 1. A system for non-intrusively monitoring a fluid level or an object in a conduit, the system comprising a component that is positioned to control flow into or out of the conduit to induce pressure waves in the conduit, wherein the conduit extends into a subterranean formation; a pressure transducer in fluid communication with the conduit, the pressure transducer positioned to measure pressure responses in the conduit due to contact of the pressure waves with the fluid level or the object; and a system controller operable to: receive pressure data from the pressure transducer, the pressure data comprising the pressure responses; and determine a distance of the fluid level or the object in the conduit, relative to the component or the pressure transducer, based on the pressure responses.

Statement 2. The system of the statement 1, wherein the pressure transducer is located at a wellhead that is in fluid communication with the conduit.

Statement 3. The system of the statement 1 or the statement 2, wherein the wellhead comprises the component.

Statement 4. The system of any one of the preceding statements, wherein a sampling rate of the pressure transducer is 1 kilohertz or higher.

Statement 5. The system of any one of the preceding statements, wherein the conduit comprises a wellbore or well annulus (pipe-in-pipe).

Statement 6. The system of any one of the preceding statements, wherein the conduit extends into an underground storage facility.

Statement 7. The system of any one of the preceding statements, wherein the underground storage facility comprises an underground cavern.

Statement 8. The system of any one of the preceding statements, wherein the underground storage facility comprises a gas.

Statement 9. A method for non-intrusively monitoring a target in a wellbore, the method comprising: controlling a component to induce at least two pressure waves in the wellbore; measuring, with a pressure transducer, pressure responses in the wellbore due to contact of the pressure waves with the target; and determining a distance of the target in the wellbore, relative to the component or the pressure transducer, based on the pressure responses.

Statement 10. The method of the statement 9, further comprising inducing at least two positive pressure waves in the wellbore via an addition of fluid into the wellbore.

Statement 11. The method of the statement 9 or the statement 10, further comprising measuring pressure responses induced by a reciprocating pump that removes fluid from the wellbore to induce at least two negative pressure waves in the wellbore.

Statement 12. The method of any one of the statements 9-11, further comprising controlling the component to allow an ingress of fluid into the wellbore or well annulus (pipe-in-pipe).

Statement 13. The method of any one of the statements 9-12, further comprising controlling the component to allow an egress of fluid from the wellbore or well annulus (pipe-in-pipe).

Statement 14. The method of any one of the statements 9-13, further comprising receiving the pressure data at intervals.

Statement 15. The method of any one of the statements 9-14, further comprising recording pressure data at a frequency ranging from 1 kilohertz (kHz) to 4 kHz, or at a frequency greater than 4 kHz or less than 1 kHz.

Statement 16. A method for non-intrusively monitoring a target in a conduit that extends into a subterranean formation, the method comprising: controlling a component to induce pressure waves in the conduit that extends into the subterranean formation; measuring pressure responses in the conduit due to interactions of the pressure waves with the target; and determining a distance of the target in the conduit, relative to the component, based on the pressure responses.

Statement 17. The method of the statement 16, further comprising controlling the component to allow fluid into the conduit to induce the pressure waves.

Statement 18. The method of the statement 16 or 17, further comprising sampling pressure data at a rate that is at least 1 kHz.

Statement 19. The method of any one of the statements 16-18, further comprising removing fluid from the conduit by controlling the component.

Statement 20. The method of any one of the statements 16-19, further comprising locating hydrates based on the pressure responses.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system for non-intrusively monitoring an object in a conduit, the system comprising:
   a component that is positioned to control flow into or out of the conduit to induce pressure waves in the conduit, wherein the conduit extends into a subterranean formation;
   a pressure transducer in fluid communication with the conduit containing a fluid, the pressure transducer positioned to measure pressure responses in the conduit due to contact of the pressure waves with the object; and
   a system controller operable to:
   receive pressure data from the pressure transducer, the pressure data comprising the pressure responses from the object wherein is a cement plug moving within the conduit during a cementing operation;
   determine a time-log of pressure change in the conduit from the pressure data;
   determine a distance-log of pressure change from the time-log of pressure change and speed of sound the fluid;

determine a distance of or the cement plug in the conduit, relative to the component or the pressure transducer, based on the distance-log of pressure change;

track a position of the cement plug during the cementing operation by repeatedly determining said distance of the cement plug at multiple points in time as it moves through the conduit; and determine a time duration for at least a portion of the cementing operation based on the tracked position of the cement plug over said multiple points in time.

2. The system of claim 1, wherein the pressure transducer is located at a wellhead that is in fluid communication with the conduit.

3. The system of claim 2, wherein the wellhead comprises the component.

4. The system of claim 1, wherein a sampling rate of the pressure transducer is 1 kilohertz or higher.

5. The system of claim 1, wherein the conduit comprises a wellbore.

6. The system of claim 1, wherein the conduit extends into an underground storage facility.

7. The system of claim 6, wherein the underground storage facility comprises an underground cavern.

8. The system of claim 6, wherein the underground storage facility comprises a gas.

9. A method for non-intrusively monitoring a target in a wellbore, the method comprising:

controlling a component to induce at least two pressure waves in the wellbore containing a fluid;

measuring, with a pressure transducer, pressure responses in the wellbore due to contact of the pressure waves with the target to generate pressure data from the target, wherein the target is a cement plug moving within the wellbore during a cementing operation;

determining a time-log of pressure change in the wellbore from the pressure data;

determine a distance-log of pressure change from the time-log of pressure change and speed of sound the fluid;

determining a distance of the cement plug in the wellbore, relative to the component or the pressure transducer, based on the distance-log of pressure change;

track a position of the cement plug during the cementing operation by repeatedly determining said distance of the cement plug at multiple points in time as it moves through the wellbore; and determine a time duration for at least a portion of the cementing operation based on the tracked position of the cement plug over said multiple points in time.

10. The method of claim 9, further comprising inducing at least two positive pressure waves in the wellbore via an addition of fluid into the wellbore.

11. The method of claim 9, further comprising measuring pressure responses induced by a reciprocating pump that removes fluid from the wellbore to induce at least two negative pressure waves in the wellbore.

12. The method of claim 9, further comprising controlling the component to allow an ingress of fluid into the wellbore.

13. The method of claim 9, further comprising controlling the component to allow an egress of fluid from the wellbore.

14. The method of claim 9, further comprising receiving the pressure data at intervals.

15. The method of claim 9, further comprising recording pressure data at a frequency ranging from 1 kilohertz (kHz) to 4 kHz.

16. A method for non-intrusively monitoring a target in a conduit that extends into a subterranean formation, the method comprising:

controlling a component to induce pressure waves in a fluid in the conduit that extends into the subterranean formation;

measuring pressure responses in the conduit due to contact of the pressure waves with the target to generate pressure data from the target wherein the target is a cement plug moving within the conduit during a cementing operation;

determining a time-log of pressure change in the conduit from the pressure data;

determine a distance-log of pressure change from the time-log of pressure change and speed of sound the fluid;

determining a distance of the cement plug in the conduit, relative to the component, based on the distance-log of pressure change; and track a position of the cement plug during the cementing operation by repeatedly determining said distance of the cement plug at multiple points in time as it moves through the conduit; and determine a time duration for at least a portion of the cementing operation based on the tracked position of the cement plug over said multiple points in time.

17. The method of claim 16, further comprising controlling the component to allow fluid into the conduit.

18. The method of claim 16, further comprising sampling pressure data at a rate of 1 kilohertz or higher.

19. The method of claim 16, further comprising removing fluid from the conduit by controlling the component.

20. The method of claim 16, further comprising locating hydrates based on the pressure responses.

* * * * *